United States Patent [19]
Griffith et al.

[11] Patent Number: 5,486,232
[45] Date of Patent: Jan. 23, 1996

[54] GLASS FIBER TACKING AGENT AND PROCESS

[75] Inventors: Edward J. Griffith, Manchester; Toan M. Ngo, Eureka, both of Mo.

[73] Assignee: Monsanto Company, St. Louis, Mo.

[21] Appl. No.: 287,037

[22] Filed: Aug. 8, 1994

[51] Int. Cl.$^6$ ....................................................... C09D 1/00
[52] U.S. Cl. ......................................... 106/286.5; 106/490
[58] Field of Search .................................. 106/286.5, 490, 106/491

[56] References Cited

U.S. PATENT DOCUMENTS

| | | | |
|---|---|---|---|
| 2,460,344 | 1/1949 | Greger. | |
| 3,755,009 | 8/1973 | Uffner. | |
| 3,922,472 | 11/1975 | Foley et al. | 428/429 |
| 3,943,231 | 3/1976 | Wasel-Nielen et al. | 106/490 |
| 4,138,261 | 2/1979 | Adrian et al. | 106/286.5 |
| 4,197,349 | 4/1980 | Walser | 428/378 |
| 4,221,602 | 9/1980 | Walser | 106/211 |
| 4,259,190 | 3/1981 | Fahey | 252/8.6 |
| 4,390,647 | 6/1983 | Girgis | 523/212 |
| 4,681,805 | 7/1987 | Puckett | 428/391 |
| 5,223,336 | 6/1993 | Griffith et al. | 428/285 |

*Primary Examiner*—David Brunsman
*Attorney, Agent, or Firm*—R. C. Loyer

[57] ABSTRACT

There is disclosed a process for preparing novel tacking agents for glass fiber insulation. The tacking agent solution is prepared by adding a condensed phosphate to an aqueous solution of aluminum orthophosphate to provide a homogeneous solution having an Al:P molar ratio of less than 1, preferably 1:3 and wherein the amount of condensed phosphate comprises from about 25 to about 75 percent of the total phosphate in the solution. The tacking agent is applied to glass fiber in the preparation of insulating articles and then heated to convert the tacking agent into a non-hygroscopic, water insoluble, amorphous, condensed aluminum phosphate polymer. The tacking agent resiliently tacks the glass fibers together so as to provide regain of shape after deformation of the fibers as by compression.

24 Claims, No Drawings

GLASS FIBER TACKING AGENT AND PROCESS

This application relates to tacking agents for glass fiber articles of manufacture useful as insulation and to a process of manufacture of tacking agents for glass fiber insulating material. More particularly, this application relates to a process for preparing a tacking agent which will bind glass fibers comprising an aluminum phosphate mixed ionic condensed polymer converted to an entirely amorphous condensed polymer after application to the fiber.

BACKGROUND OF THE INVENTION

Coatings for glass articles are numerous in both kind and purpose. The versatility of glass in recent years has caused the industry to apply coatings to glass, particularly in the form of fibers, to impart a particular physical property to the fiber. Protective coatings for glass fibers are disclosed in U.S. Pat. No. 2,444,347 to Greger et al. providing resistance to alkaline environment and to bond the fiber together. Of particular interest were glass fibers of very small diameter, termed therein "glass wool". In this form there is a large surface to volume ratio. The coating imparts some protection to the surface exposed to hostile environments. Colloidal solutions of aluminum phosphates are employed to mold glass-wool into shaped articles. The aluminum phosphates employed in the coating process are prepared in accordance with U.S. Pat. No. 2,405,884 to Greger. Technical Bulletin I-236 published by Monsanto Company also suggests the use of colloidal aluminum phosphates as binding agents for glass fiber mats and insulation referring to the above-mentioned patent to Greger et al.

Glass fiber structures having superior heat resistance are described in Japanese Kokai No. 48 92690. According to this publication, glass fiber especially useful under elevated temperatures is provided by coating the glass fiber with a solution of aluminum phosphate or aluminum phosphate-chrome oxide complex to a thickness of from 0.1 to 10 microns. The coated fiber is heated to at least 150° C. to form a uniform crystalline coating on the surface of the fiber.

Water-soluble solid aluminum phosphate complexes and binder compositions for refractory compositions or alumina are disclosed in U.S. Pat. Nos. 3,899,342 and 3,788,885, both to Birchall et al. The '885 patent claims priority of a British application which contains a lengthy disclosure of various aluminum phosphate complexes and compositions as well as many utilities of such materials including use in fibrous materials. The '885 patent is directed to use in inorganic, fibrous materials.

In the '889 patent to Birchall et al., the composition described as a complex is provided by mixing a solution of aluminum orthophosphate having an Al:P molar ratio of substantially 1:1 with anions of a carboxylic acid or a mineral oxy-acid and curing the phosphate binder at a temperature of from 80° C. to 200° C. or higher. Also disclosed are cold curing methods which employ a curing agent such as magnesium oxide. Cast articles are formed wherein the refractory is placed in a mold. Oxy-acids, such as citric and oxalic acids, are suggested for complexing agents with the orthophosphate. In the '885 patent there is disclosed complexes having a ratio of gram atoms of aluminum to the number of gram atoms of phosphorus in the complex of from 1:2 to 2:1 but preferably 1:1. The complex contains at least one chemically bonded compound described as having a formula, ROH, wherein the R group is an organic group of hydrogen and an anionic group of a strong inorganic acid other than an oxyphosphorus acid. Another composition disclosed in the '885 patent is, more simply, a solution of aluminum orthophosphate wherein the Al:P ratio (gram atoms) is limited to at least 1:1.

In U.S. Pat. No. 4,147,823 to Lavalee, an ink for glass and ceramic substrates can be formulated by reacting an aluminum salt of a weak organic acid such as a stearate or palmitate with phosphoric acid to provide a matrix of insoluble aluminum phosphate cement. The complex contains filler and color pigment components which are caused to adhere to glass surfaces such as electric light bulbs. The bonding agent is heat cured at about 300° C. to form an adhesively bonded mark on the glass.

Low density, high heat resistant glass fiber insulation is prepared according to Kokai No. 60-209067 to Suganuma et al. by impregnating a glass fiber needle mat with a slurry comprising an aqueous solution of an aluminum or magnesium phosphate and one or more refractory compositions such as alumina, kaolin, feldspar, etc. The glass fiber, in the form of a needle mat, is impregnated with the slurry and dried at 120° C. for about one hour followed by two additional hours at 320° C. to provide a molded refractory article.

A broad range of inorganic fibers are treated with a biphosphate to provide heat and flame resistance, durability and adhesion on the surface of the fibers according to Japanese Kokai No. 2-149453. Metals employed to form the biphosphate in aqueous solution are metals of Groups I, II and III of the periodic table with aluminum and magnesium preferred. The biphosphate is sprayed onto fibers, such as glass fibers, whereupon the fiber surface is partially dissolved so that the fibers are bonded in block form or bonded together providing a non-woven cloth with superior heat resistance. The biphosphate is said to be polymerized and solidified on the surface of the fiber.

Modern glass fiber insulation materials comprise very small diameter filaments and are commonly provided with organic resin coatings for several purposes. First, the brashness of glass fiber is reduced so that the amount of dust and breakage of filaments during shipping and handling is reduced. Further, glass fiber insulation is commonly supported on a substrate, such as paper or aluminum which provides, in addition to support, also insulating value. The insulation is usually prepared in a certain thickness thereby providing a desired amount of insulating value. During packaging and shipping the insulation is compressed to conserve space but when unpackaged at the location of use, the insulating material on the substrate is expected to expand so as to provide insulating value to the degree required. Another function of the organic resin coating on the glass fiber is to provide sufficient flexibility of the glass filaments such that the filaments regain most of the original thickness needed to provide the expected insulating value after packaging and unpackaging. While providing the above-described desirable results, organic resins have the possibility of contributing to environmental problems in waste disposal and in the event of combustion in the structure being insulated may emit undesired fumes. Organic resins are also combustible.

In U.S. Pat. No. 5,223,336, to the present inventors, (our previous patent) there is disclosed a more environmentally advantageous and effective tacking agent for glass fiber, particularly in the insulation function where substrate support is employed. The tacking agents disclosed therein are prepared by combining $Al_2O_3$ with an aqueous solution of orthophosphoric acid so as to form a solution having an Al:P ratio of less than 1, preferably in the range of 1:2 to 1:4 and most desirably in about 1:3. Sufficient water is included to provide a free flowing solution and may be up to about 95% by weight. The amount of water referred to is both combined and free water. An ionic polymer is formed in aqueous solution. Such tacking agent provides a resilient, environmental advantageous tacking agent particularly suited to the production of glass fiber insulation.

However, to provide such effective tacking agent according to U.S. Pat. No. 5,223,336, the glass fiber containing the above noted tacking agent is heated or cured at temperature in the range of at least about 350° C. to about 400° C. in order to convert the ionic material to a covalently bonded, water insoluble, non-hygroscopic, condensed phosphate polymer containing the aluminum atom. There is desired a tacking agent with the above noted properties which can be obtained at lower temperatures on the glass fiber. Such tacking agent would obviously conserve energy expended on the glass fiber. Since glass fiber intended for use as insulation is made in large volume the amount of energy savings at the glass fiber production level would be economically significant.

BRIEF DESCRIPTION OF THE INVENTION

In accordance with this invention, there is provided novel tacking agents for glass fiber articles suitable for insulating purposes and processes for preparing such tacking agents which agents can be converted to covalently bonded, water insoluble, non-hygroscopic, condensed phosphate polymers containing aluminum atoms at temperatures in the range of from about 204° C. to about 315° C. depending upon the time allowed in said temperature range. Typical cure times range from about 45 seconds to about 5 minutes.

The tacking agents of this invention are prepared by a process which comprises combining an aqueous solution of orthophosphoric acid and $Al_2O_3$ wherein the Al:P ratio is less than 1 (said ratio as noted above and as taught in U.S. Pat. No. 5,223,336) and a condensed phosphate polymer which may or may not contain aluminum atoms. The final composition contains an Al:P ratio preferably 0.1 to 0.5. The aqueous solution is then applied to the glass fiber in similar manner as taught in our earlier patent referred to above except that the treated glass fiber is heated to a temperature in the range of from about 204° C. to about 315° C. to form resiliently tacked glass fiber insulation having highly desirable properties.

The treatment provides a small amount of solution on the fiber surface, at least a portion of which has already been converted to a condensed polymer. By at least a partial conversion to the condensed polymer prior to the application of the tacking to the glass fiber, the amount of heat for removal of water thereby is lowered and the amount of energy required to be applied to the glass fiber treated with the tacking agent is reduced. Because of the presence of the aqueous solution of orthophosphoric acid solution containing the $Al_2O_3$, the tacking agent is very fluid, enabling it to flow along the surface of the fibers and to collect at fiber-fiber contact points due to surface tension. The fiber lattice is then subjected to heat treatment to remove water and to form the amorphous, condensed polymer having the above noted desirable properties. It has been found that when the fiber lattice is formed in this manner there is provided a resilient lattice structure. In accordance with this invention, there is provided an excellent tacking agent for the glass fibers which allows the glass fiber article to substantially recover its shape and size after compaction. Generally, the amount of amorphous polymer needed to tack the glass fiber satisfactorily is in the range of from about 1% to about 5% of the total weight of the glass fiber.

Polymerization of the acid phosphate is achieved more quickly than the tacking agents disclosed in our earlier patent by heating the treated fiber because less water of composition is required to be removed to form an amorphous, non-hygroscopic, condensed polymer than in previous solutions containing only orthophosphate. Typical means to remove water from the ionic polymer may be employed such as electric or gas fired waffle ovens, infrared or microwave ovens.

DETAILED DESCRIPTION OF THE INVENTION

The tacking agents of this invention are prepared by forming a first aqueous solution combining aluminum oxide, such as $Al_2O_3.3H_2O$, with orthophosphoric acid and water substantially as taught in our previous patent. In practice the aluminum oxide is added to the water-phosphoric acid mixture which has been heated to a temperature above about 100° C. A clear viscous solution results which can be diluted with water. To this solution is added a condensed phosphate polymer. The condensed phosphate polymer may or may not contain aluminum atoms.

The condensed phosphate polymer can be prepared in any convenient manner. Most conveniently, such condensed phosphate is prepared by forming a second solution identical to the first solution as noted above and then heating the solution whereby the ionic phosphate polymer containing aluminum atoms condenses to form a viscous or solid mass. The mass is then added to the first solution along with sufficient water to adjust the total composition to a satisfactory viscosity for application to the glass fiber.

The temperature to which the second solution is heated for the purpose of forming a condensed phosphate polymer containing aluminum atoms is in the range of from about 350° C. to about 425° C. and more specifically to a temperature of about 400° C. Of course, the amount of time taken to heat the second solution is inversely related to the temperature to which the solution is heated. In the process wherein a temperature in the above noted ranges is employed, the time required for the condensation reaction to occur is generally in the range of from about 4 to about 6 minutes. Depending upon the amount of material, the time and temperature are variables easily determined by visual observation as the character of the solution changes upon the formation of the desired condensed amorphous polymer.

Another procedure whereby there is prepared a condensed amorphous phosphate polymer containing aluminum atoms is one wherein an aqueous solution of alkali metal polyphosphate glass (sometimes referred to as a hexametaphosphate such as sodium hexametaphosphate) is combined with an aluminum salt such as aluminum sulfate in the proper Al:P ratio as noted above. The process of ion exchange occurs whereby the aluminum ions displace the alkali metal ions causing the polymer containing aluminum ions to precipitate. The by-product sodium sulfate remains in solution and can be separated by filtration. The precipitate is then added to the first solution to prepare the tacking agent of this invention. In similar manner, other condensed phosphates can be used to prepare tacking agents of this invention by introducing the condensed phosphate into an orthophosphoric acid containing aluminum ions. Typical examples of other condensed phosphates include Kurrols Salt, soluble and insoluble metaphosphate, ammonium polyphosphate, tripolyphosphate, ultraphosphoric and polyphosphoric (metaphosphoric) acids and salts. Aluminum oxide may also be combined with $P_2O_5$ and water to form the desired condensed polymer containing aluminum atoms which can be combined with a solution containing aluminum ions in proper proportion. For example, polyphosphoric acid (sometimes termed metaphosphoric acid) having a $H_2O/P_2O_5$ ratio of from about 0.5 to about 1.5 can be employed as the condensed phosphate. A preferred polyphosphoric acid has a chain length of about 50. The polyphosphoric acid can be dissolved in an orthophosphoric acid solution containing aluminum ions so as to provide about 50% of the phosphorus atoms in the solution combined in the polymer state and an Al/P ratio preferably in the range of from about 1:3. The mixture, after application to fiber glass, is cured to provide a condensed aluminum phosphate polymer binding agent.

The amount of condensed phosphates included in the novel tacking agents of this invention can vary widely. For example, the total phosphate in the tacking agent may comprise from 25 to 75 percent condensed phosphate and the remainder of the phosphate comprising orthophosphate. Typically, the amount of condensed phosphate in the tacking agents of this invention is in the range of from about 45 to 50 percent of the total phosphate in the composition.

As with the prior art tacking agents taught in our earlier patent, the tacking agent of this invention can be diluted with water to provide a solution easily applied to glass fibers such as by spraying the fibers at a convenient location after filament formation and preferably before combination into an article for use as insulating material. As will be shown in the Examples below, the viscosity of the coating solutions of this invention can be adjusted by the amount of water included therein. One advantage of such adjustment is to provide a suitable viscosity for the particular means employed to apply the coating solution to the fiber glass. It is not important as to the exact time or location for the application of the aqueous solution.

After application of the aqueous solution to the glass fiber, the treated fiber is subjected to polymerization condition(s) wherein the soluble acid aluminum phosphate is converted to a water insoluble, amorphous condensed polymer by removal of water. Because of the reduced amount of orthophosphate in the tacking agent the amount of time and the amount of energy as indicated by temperature is greatly reduced. As noted above, the removal of water is performed by any suitable means such as by heating the treated fiber. It is important to control the removal of water whether conducted by air convection, furnace, oven or microwave, so as to produce the amorphous polymer. If the removal of water is insufficient, the desired change does not occur and the residue may be hygroscopic. If the removal of water is accompanied by excessive amount of heating and water removal, an undesired crystalline aluminum phosphate may be produced. In either of the above cases, the desired amorphous polymer is not formed in sufficient amounts to impart the desired properties in the glass fiber article.

It has been found that the desired water insoluble amorphous polymer is formed by heating the treated glass fiber to a temperature in a minimum range of from about 350° F. to about 400° F. Higher temperatures may be employed to shorten the time needed to convert the orthophosphate in the tacking agent to the condensed polymer such as up to about 600° F. Typically the amount of time required to convert the orthophosphate to the desired condensed polymer is in the range of from about 45 to about 90 seconds although at minimum temperatures longer periods may be required. The relationship of time and temperature is regulated so as to remove the above-noted amount of water from the solution so as to form the desired amorphous polymer.

Treatment of the glass fibers in accordance with this invention does not necessarily entail the complete coating of the fiber with the ionic polymer. However, there should be a sufficient amount of solution on the cross-over points of the very fine fibers with each other to provide a resilient tacking force by the amorphous polymer of sufficient strength to hold the shape of the article into which it has been formed prior to heating. That is, the shape of the article is resumed after compaction and to the approximate original size.

In addition, other inorganic acids may also be included in minor amounts. Inorganic acids may include, for example, boric acid, which is added for the purpose of preventing the components of the aqueous solution from salting out and may be added in amounts of from about 0.06% to about 0.5 percent, by weight, based upon amount of $Al_2O_3/P_2O_5$ included therein. As will be shown below in the preferred embodiments, the aqueous solution is usually provided by combining aluminum oxide (including the various hydrates) in water with orthophosphoric acid. Following addition, the solution is formed upon heating to a temperature in the range of from about 105° C. to about 120° C. for a period of from about 30 to about 40 minutes. The concentration of the aqueous solution can be provided over a broad range and is mainly determined by the equipment employed in its application to the glass fiber. When the solution is combined with preformed polyphosphates, it is desirably sprayed onto the glass fiber in an aqueous solution which may be prepared over a broad range of concentration of from about 5% to about 30%, by weight, although there is no intention of limiting this invention by such concentration as there are several suitable means for applying the solution to the fiber.

By forming and incorporating the condensed phosphate polymer in the tacking agent containing aluminum prior to its application to the glass fiber, the amount of time required to provide the advantageous glass fiber insulation product at elevated temperature is greatly decreased. Such decrease in time is proportional to the amount of condensed phosphate polymer incorporated into the tacking agent prior to application to the glass fiber. It has been surprisingly found that while the "curing" temperature employed to remove water from the glass fiber tacking agent after application of the tacking agent to the glass fiber is greatly lowered in accordance with this invention, substantially the same result is obtained as previously reported in our earlier patent which required substantially higher "cure" temperatures. Thus the amount of energy required and the "cure" time needed to set the tacking agent on the glass fiber is greatly reduced in accordance with this invention.

DESCRIPTION OF THE PREFERRED EMBODIMENTS

The following examples illustrate the preparation of compositions of this invention. In these examples percent is expressed as percent by weight unless otherwise noted. Also, when percent solids of spray solutions is given in the following examples, said solids are calculated on the amount of $Al_2O_3+P_2O_5$.

EXAMPLE 1

A 45.5% solution of aluminum orthophosphate having an Al/P ratio of 1:2.941 is prepared with distilled water. Into a ceramic container there were placed 80 g of this solution which was then heated on a hot plate for 16 minutes. The heated solution was then placed in a furnace and heated to 400° C. for 6 minutes which converted the orthophosphate into a condensed aluminum phosphate polymer. A dry solid (40.7g) was obtained which was ground to a fine powder with a mortar and pestal. With stirring, 23 g of the dried solution was dissolved into 110 g of a 45.5% solution of aluminum orthophosphate. A glass fiber tacking agent was prepared by diluting 30g of the combined solution containing aluminum orthophosphate and condensed aluminum phosphate polymer with 198.75 g of distilled water to provide an 8% solution based upon total solids.

Standard commercial glass fiber insulation having a combination paper/aluminum backing and an insulation value rating of R-11 was obtained and stripped of its organic coating and dye by heating 5 inch by 4 inch segments in a muffle furnace at 450° C.–470° C. for a period of from 45 minutes to 1 hour. After removal and cooling, the above described 8% solution was sprayed onto glass fiber at the rate of about 8% by weight of the glass fiber and cured at 400° F for a total of 3 minutes. The data obtained is set forth below in table I wherein all weight is reported for the glass fiber in grams.

TABLE I

| | |
|---|---|
| Dry Weight | 22.53 |
| Sprayed Weight | 31.4 |
| Cured - 2 minutes | 26.9 |
| Cured - 3 minutes (constant wt.) | 25.0 |

The cured glass fiber was resiliently bonded and provided a satisfactory mat for suitable for use as insulation. After exposure to humid atmosphere there was no weight gain indicating that the tacking agent was completely converted to the condensed polymer form.

EXAMPLE 2

The procedure of Example 1 is repeated with the exception that the heating step at 400° C. was for only 5 minutes and 39.5 g of the polyphosphate polymer obtained. A portion of the polyphosphate, 24.5g was dissolved into the orthophosphate. Results similar to that obtained in Example 1 were obtained with the use of this material as a tacking agent on glass fibers.

EXAMPLE 3

Into a 1 L beaker containing 200 ml of distilled water was placed 30 g of sodium hexametaphosphate (polyphosphate glass) with slow addition. The solution was stirred until clear. Then 34.2 g of $Al_2(SO_3)_2$ was added to the solution with continued stirring. Aluminum polyphosphate formed and precipitated from solution. Additional water was required to provide convenient stirring. The solution was filtered over night with vacuum to remove the insoluble condensed aluminum phosphate polymer from the water soluble material. A wet cake of about 85g was obtained.

Into 80 g of a 45.5 percent aqueous solution of aluminum orthophosphate was placed 20 g of the wet cake obtained above. The mixture of aluminum orthophosphate and condensed aluminum phosphate polymer formed a stable, clear solution within less than 1 hour with stirring at room temperature.

EXAMPLE 4

The procedure of Example 3 is repeated with the exception that the wet cake of condensed aluminum phosphate polymer is air dried at room temperature forming a transparent glass. The dried condensed polymer was then ground to a powder and 8.563 g of the ground powder was slowly added to a 45% aqueous solution of aluminum orthophosphate solution. The solution remained cloudy after 1 hour of stirring after which about 20 g of distilled water was added. The solution became clear after more than 5 hours of continuous stirring. The solution can be diluted and sprayed onto glass fiber to form a non-hygroscopic, water insoluble resilient tacking agent after curing.

While the illustrative embodiments of the invention have been described with particularity, it will be understood that various other modifications will be apparent to and can readily be made by those skilled in the art without departing from the scope and spirit of the invention.

We claim:

1. A process for preparing a tacking agent useful as a glass fiber tacking agent which comprises:
   a. forming a first composition comprising an aqueous solution of aluminum orthophosphate;
   b. forming a second composition comprising a condensed covalently bonded phosphate polymer and;
   c. combining said first and second compositions whereby the amount of condensed phosphate polymer in the resulting composition comprises from about 25 to about 75 percent by weight of the total phosphate and the Al:P molar ratio is less than 1.

2. The process of claim 1 wherein the second composition is formed by heating an aqueous solution of aluminum orthophosphate.

3. A process of claim 1 wherein first composition is prepared by combining an aqueous solution of phosphoric acid and aluminum oxide whereby the molar ratio of $Al_2O_3$ to $P_2O_5$ is in the range of from about 1:2 to about 1:4.

4. The process of claim 3 wherein the molar ratio of $Al_2O_3$ to $P_2O_5$ is about 1:3.

5. The process of claim 1 wherein the molar ratio of Al:P of said second composition is in the range of from about 1:2 to about 1:4.

6. The process of claim 5 wherein the molar ratio of Al:P of said second composition is about 1:3.

7. The process of claim 1 wherein the molar ratio of Al:P of the composition of step c is in the range of from about 1:2 to about 1:4.

8. The process of claim 7 wherein the molar ratio of Al:P of the composition of step c is about 1:3.

9. The process of claim 1 wherein said second composition is formed by ion exchange between aluminum ions and alkali metal ions of a condensed phosphate polymer.

10. The process of claim 9 wherein the condensed phosphate polymer is an alkali metal hexametaphosphate.

11. The process of claim 10 wherein the alkali metal is sodium.

12. The process of claim 9 wherein the condensed phosphate polymer is selected from the group consisting of, soluble and insoluble metaphosphates, ammonium polyphosphate, tripolyphosphate and ultraphosphoric acids and salts.

13. The process of claim 12 wherein the condensed phosphate polymer is a phosphoric acid.

14. The process of claim 9 wherein the condensed phosphate polymer is Kurrol's Salt.

15. A composition comprising an aqueous solution of aluminum orthophosphate and a condensed phosphate polymer, wherein from about 25 to about 75 percent by weight of the total phosphate is present as condensed phosphate polymer and wherein the Al:P molar ratio of said composition is less than 1.

16. The composition of claim 15 wherein the Al:P molar ratio of said composition is in the range of from about 1:2 to about 1:4.

17. The composition of claim 16 wherein the molar ratio of Al:P of said composition is about 1:3.

18. A composition of claim 15 wherein the condensed aluminum phosphate polymer is provided by heating an aqueous solution of aluminum orthophosphate.

19. A composition of claim 15 wherein the condensed aluminum phosphate polymer is formed by ion exchange between aluminum ions and alkali metal ions of a condensed phosphate polymer.

20. The composition of claim 19 wherein the condensed phosphate polymer is an alkali metal hexametaphosphate.

21. The composition of claim 20 wherein the alkali metal is sodium.

22. The composition of claim 19 wherein the condensed phosphate polymer is selected from the group consisting of, soluble and insoluble metaphosphates, ammonium polyphosphate, alkali metal tripolyphosphate and ultraphosphoric acids and salts.

23. The composition of claim 15 wherein the condensed phosphate is a polyphosphoric acid.

24. The process of claim 19 wherein the condensed phosphate polymer is Kurrol's Salt.

* * * * *